(12) United States Patent
Lekson et al.

(10) Patent No.: US 6,305,813 B1
(45) Date of Patent: Oct. 23, 2001

(54) DISPLAY DEVICE USING A LIGHT GUIDE FOR EXTERIOR AUTOMOTIVE LIGHTING

(75) Inventors: Matthew Andrew Lekson, Farmington Hills; Jianzhong Jiao, Novi, both of MI (US)

(73) Assignee: North American Lighting, Inc., Farmington Hills, MI (US)

( * ) Notice: Subject to any disclaimer, the term of this patent is extended or adjusted under 35 U.S.C. 154(b) by 0 days.

(21) Appl. No.: 09/372,567

(22) Filed: Aug. 11, 1999

(51) Int. Cl.$^7$ ........................................... F21V 7/04
(52) U.S. Cl. ................. 362/31; 362/26; 362/27; 362/560
(58) Field of Search ................. 362/31, 26, 27, 362/511; 385/146

(56) References Cited

U.S. PATENT DOCUMENTS

| | | | |
|---|---|---|---|
| 4,989,956 | 2/1991 | Wu et al. | 350/345 |
| 5,101,325 | 3/1992 | Davenport et al. | 362/31 |
| 5,165,772 * | 11/1992 | Wu | 362/26 |
| 5,227,773 | 7/1993 | Wu et al. | 340/815 |
| 5,590,945 | 1/1997 | Simms | 362/31 |
| 5,707,130 | 1/1998 | Zwick et al. | 362/31 |
| 5,772,304 | 6/1998 | Smith | 362/31 |
| 5,791,757 | 8/1998 | O'Neil et al. | 362/32 |
| 5,890,796 * | 3/1999 | Marinelli et al. | 362/307 |

* cited by examiner

*Primary Examiner*—Sandra O'Shea
*Assistant Examiner*—Bertrand Zéadé
(74) *Attorney, Agent, or Firm*—McDonnell, Boehnen Hulbert & Berghoff

(57) ABSTRACT

A display device is provided for providing lighting in exterior and interior lighting applications, such as for center high mount stop lights (CHMSL) and other automotive lighting applications. The display device uses a light guide having light couplers on a light source end for receiving light from at least one light source. The light guide extends from the light source end with a light emitting surface and a light guide surface opposite the light emitting surface. The light emitting surface and the light guide surface extend in a direction substantially parallel to the direction of the light received from the light source. The light guide surface has a plurality of surface sections extending at angles relative to one another. The surface sections may be angled at alternating sections direct light towards the light emitting surface using total internal reflection.

8 Claims, 3 Drawing Sheets

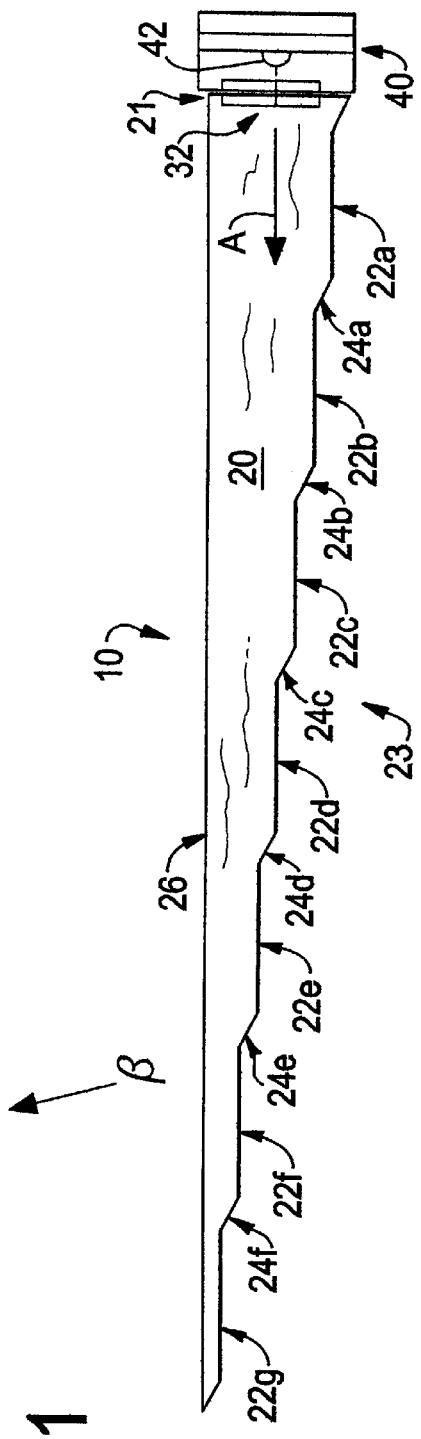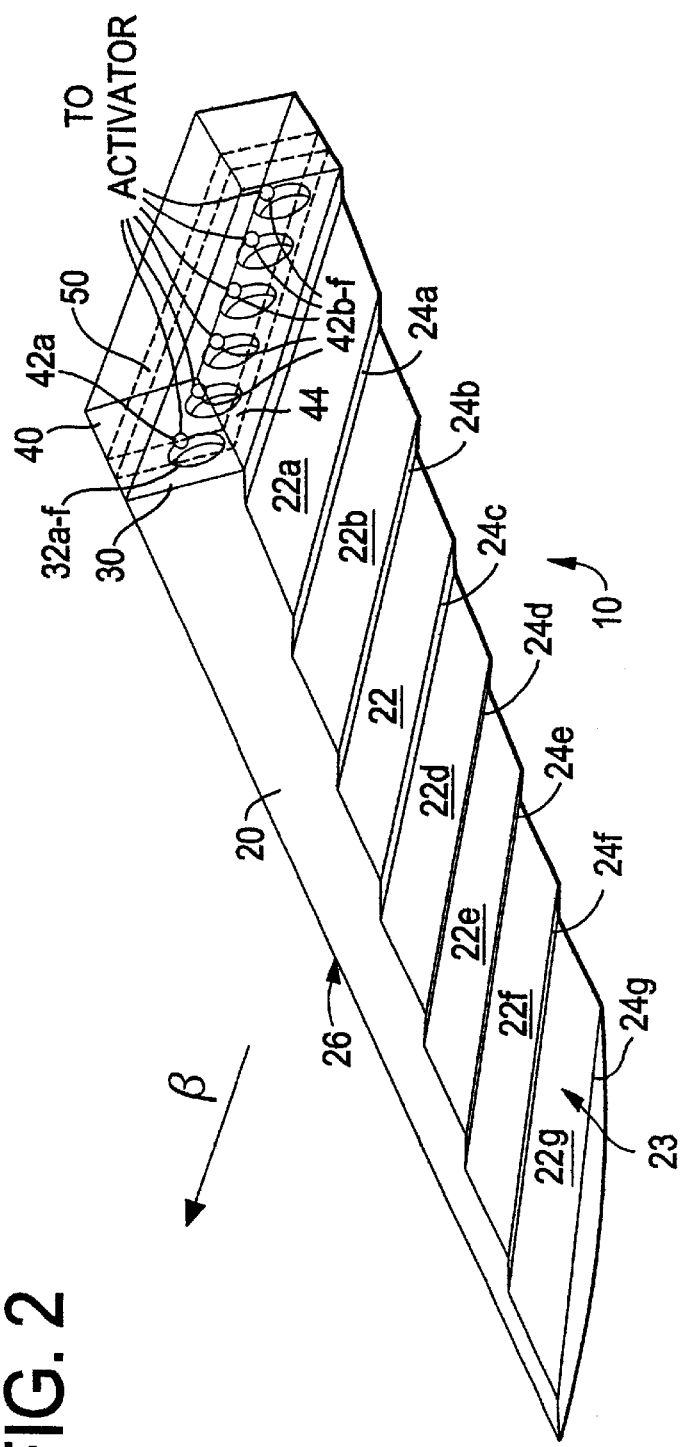
FIG. 1
FIG. 2

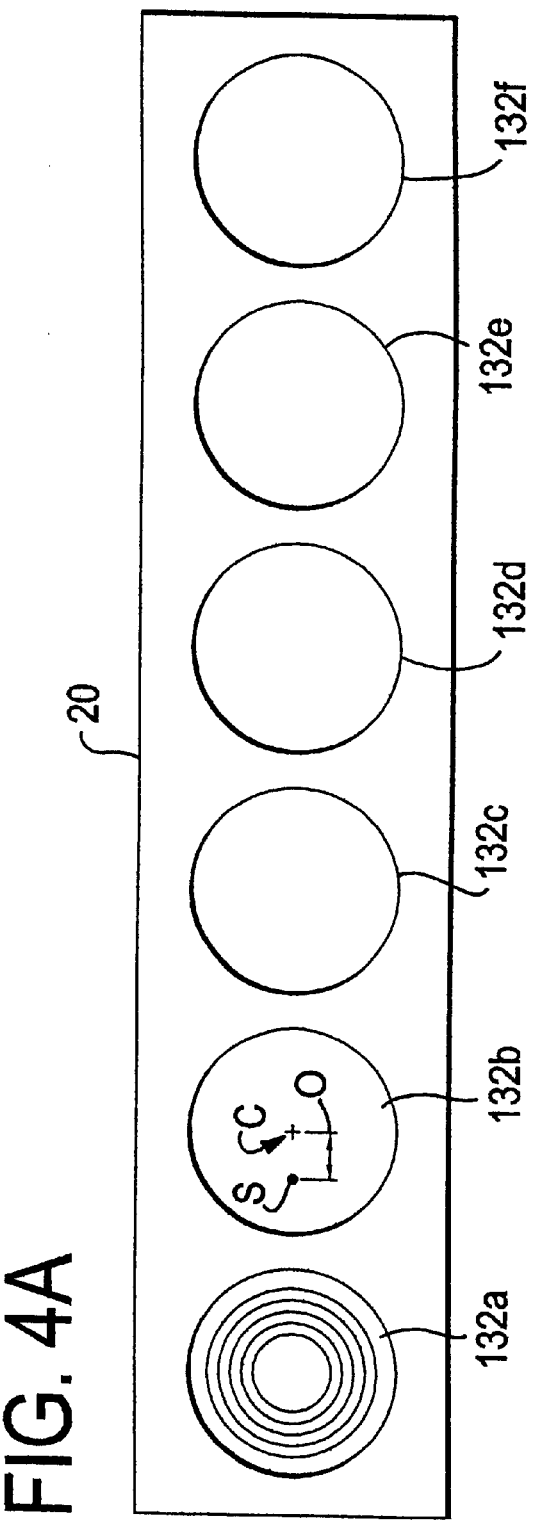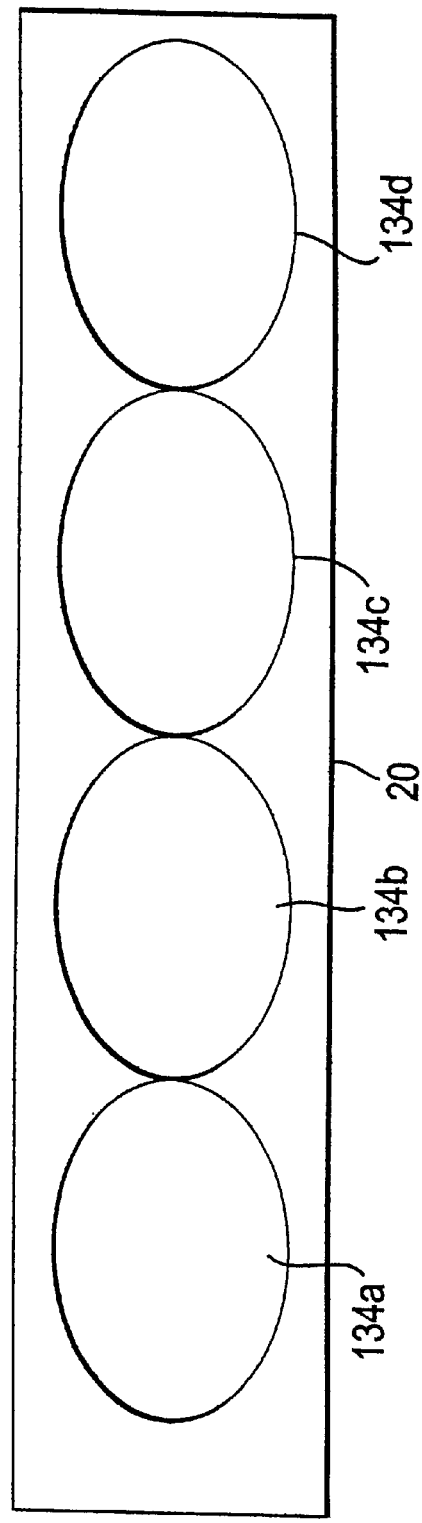

DISPLAY DEVICE USING A LIGHT GUIDE FOR EXTERIOR AUTOMOTIVE LIGHTING

BACKGROUND OF THE INVENTION

A. Field of the Invention

The present invention relates to the field of illuminating systems, and more particularly to the field of display devices used in automotive lighting.

B. Description of Related Art

Center high mount stop lights (CHMSL) are red colored, light emitting display devices that are mounted to illuminate to the rear of an automobile from a position that is elevated and roughly center to the stop lights on the right and left sides of the rear end of the automobile. Conventional CHMSLs consist of a lamp assembly having a housing containing an external lens with a bulb. The housing typically has a reflective coating on the inside surface. The lamp assembly may come in various shapes and sizes. Many of these assemblies require several components to be connected together. For example, in addition to the lens and housing, a separate bracket may be included to facilitate the attachment of a bulb socket. The complexity of the structure of CHMSLs may add significantly to the cost of manufacturing the CHMSLs. This in turn adds to the cost of the automobile.

CHMSLs may be mounted in any part of the rear of the automobile that allows the CHMSL to be elevated and centered relative to the low-mounted brake lights. Because of its elevated position, the visibility of CHMSLs may be improved by designing it to illuminate with a high-intensity beam having a light spread distribution in the vertical direction that facilitates visibility from different elevations. Manufacturers are now required to produce CMHSLs having a light spread distribution in accordance with specifications set by government regulations, such as for example, the FMVSS 571.108 issued by the National Highway Traffic Safety Administration.

The use of light guides for exterior lighting is known in the art. U.S. Pat. No. 5,772,304 to Smith (hereinafter "Smith") discloses a rear exterior lamp that uses a light guide in which a three dimensional tapered surface reflects light through a light panel. One disadvantage of using Smith, particularly for use as a CHMSL, is that the light emitted by the light panel having the tapered surface does not diverge to provide a light spread distribution. The light emitted by Smith is substantially parallel making it unsuitable for use as a CHMSL or any other exterior lighting requiring a light spread distribution. Smith also requires a light panel and other parts that result in a structure that significantly complex making it a costly solution in terms of labor and material.

U.S. patent application Ser. No. 5,165,772 to Wu (hereinafter "Wu") discloses a visual display device structure using a light guide that is particularly designed for use as a CHMSL. The device in Wu includes a substrate material that is stepped on one surface, each step being at an angle to provide a light distribution spread using the light diverging through refraction at the step. One disadvantage with using Wu, however, is that its use is limited to CHMSLs that are mounted at small angles. Another disadvantage with Wu is that the stepped surface makes the light guide in Wu unsuitable for use as exterior lighting.

One of ordinary skill in the art will appreciate that while the present discussion focuses on CHMSLs, the principles, problems and solutions may also apply to other lighting systems. For example, it may be desirable in other lighting applications such as tail lights, other signal lights for automobiles, street lights, interior lighting, courtesy lighting and other signal lighting to illuminate at a selected light spread distribution.

It would be desirable to have an exterior lighting system that may be made to provide a high-intensity beam with a selected light spread distribution.

It would also be desirable to provide an exterior light with a simple structure that may be manufactured at a low cost. For example, it would be desirable to have an exterior light that uses no external lens.

It would also be desirable to provide an external lighting system that is flexible in design to permit a variety of configurations and unique appearance.

SUMMARY OF THE INVENTION

In view of the above, a display device is provided that uses at least one light source operable to radiate a light in a first direction. At least one light coupler is adjacent to the at least one light source to receive the light and to distribute the light in the first direction. A light guide made of a substrate material is provided having a light source end adjacent to the at least one light coupler to receive the distributed light. A light emitting surface extends from the light source end substantially along the first direction. A light guide surface extends from the light source substantially along the first direction and opposite the light emitting surface. The light guide surface includes a plurality of first surface sections Each first surface section is separated by at least one of a plurality of second surface sections. The first surface sections extend at different angles from the second surface sections. At least one of the first and second surface sections is at a reflective angle to provide reflection of the light generated by the light source. The reflected light is emitted from the light emitting surface with a light distribution spread in a second direction.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 1 is a side view of a display device according to one embodiment of the invention;

FIG. 2 is a perspective view of the display device shown in FIG. 1;

FIGS. 4A and 4B are cross-sectional views of the display device in FIG. 3 at the section 4–4'.

DETAILED DESCRIPTION OF THE PREFERRED EMBODIMENT

Figure 3:
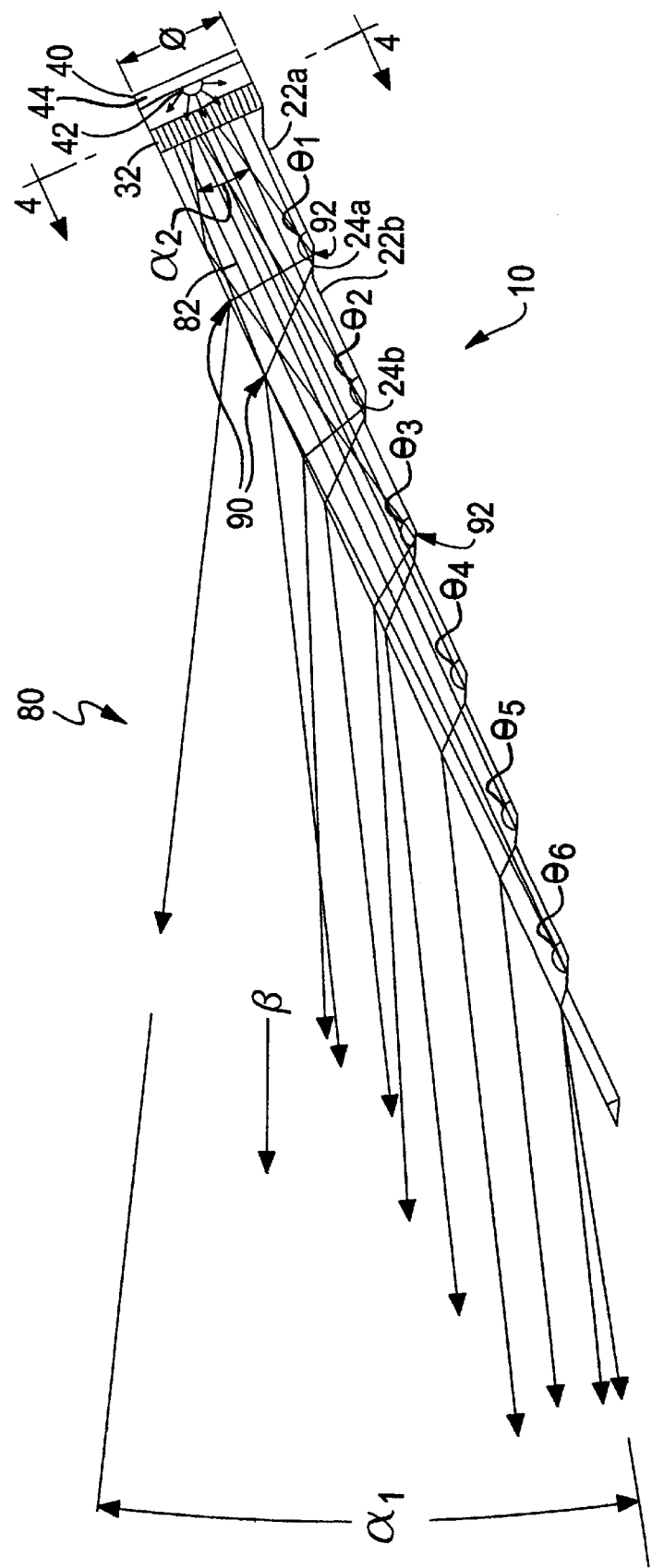
FIG. 3 is a side view of the display device of FIG. 1 showing light generated from the light source and emitted from the light guide.

FIG. 1 is a side view of a display device 10 having a light source assembly 40, at least one light coupler 32 and a light guide 20. The light guide 20 has a light source end 21 physically joined to the light coupler 32 and to the light source assembly 40. The light source assembly 40 includes at least one light source 42 for generating a light that radiates generally parallel to the length of the light guide as indicated by the arrow labeled A. The light is passed through by the light coupler 32 into the light guide 20.

The light guide 20 includes a light emitting surface 26 and a light guide surface 23. The light guide 20 is composed of a substrate material that has a refractive index that is greater than the medium contacting the light emitting surface 26 and the light guide surface 23. The light emitting surface 26 of the display device 10 shown in FIG. 1 is advantageously a smooth surface precluding the need for a separate exterior lens. The medium contacting the light emitting surface 26 is therefore typically air. The medium contacting the light guide surface 23 may be any medium having a refractive index that is less than that of the substrate material.

The light guide surface 23 has a plurality of first surface sections 22*a–g* and a plurality of second surface sections 24*a–f*. The first and second surface sections 22*a–g*, 24*a–f* are generally planar sections extending from the light source end 21 at planar angles to one another. The angular relationship between the first and second surface sections 22*a–g*, 24*a–f* direct the light within the light guide 20 by total internal reflection. The light radiating in the direction A that is incident to the first and/or second surface sections 22*a–g*, 24*a–f* at an angle that is less than a critical angle for total internal reflection is reflected towards the light emitting surface 26. The light is reflected such that it is incident to the light emitting surface 26 at an angle that is greater than the critical angle and therefore refracted out in the general direction at B. In accordance with the principles of total internal reflection, the critical angle is the angle formed by the direction of the incident light and the surface upon which it is incident beyond which the incident light is refracted through the surface.

The light guide 20 is composed of a solid substrate material such as moldable plastics or glass. Moldable plastics that may be used include acrylic and polycarbonates. The substrate material may be made of a colored material (e.g. red, yellow, etc.) in accordance with the specific purpose for which the light is to be used. For example, if the display device 10 is used as a center high-mount stop light (CHMSL) it will be colored red. Alternatively, the substrate material may be a clear color such that the color of the light emitted may be determined by the light source.

The light source assembly 40 includes at least one light source 42. The light source 42 may include any light source that may be used in exterior automotive lighting, such as a light emitting diode (LED), a fiber optic device output, and an incandescent lamp. The light source 42 may also include neon or other tubular sources such as cold cathode fluorescent sources. In a preferred embodiment, the light source 42 includes a plurality of LEDs arranged linearly at the light source end 21 of the light guide 20. The LED may be any color such as red, yellow, or white.

FIG. 2 is a perspective view of the display device 10 of FIG. 1. The light source assembly 40 in FIG. 2 is depicted as transparent to illustrate any relevant detail inside the assembly 40. The light source assembly 40 includes a light source circuit board 44 on which the light sources 42*a–f* are mounted. The light sources 42 may be surface-mounted, or mounted on leads. Each light source 42*a–f* includes a connection 50 that is connected to an activator that controls the on and off state of the display device 10. For example, the activator may be a brake pedal in an automobile, such that when the brake pedal is depressed, the display device 10 illuminates light.

Shown in FIG. 2, each light source 42*a–f* is positioned in close proximity to a corresponding light coupler 32*a–f*. The light couplers 32*a–f* receive the light generated by the light sources 42*a–f* and couples the light into the light guide 20. In a preferred embodiment, the light couplers 32*a–f* diverge or spread the light such that, incident light passes through the light guide at angles that permit reflection off of the first and/or second surface sections 22, 24. The light couplers 32*a–f* may collimate the light, or couple collimated light, such that it reflects off any of the second surface sections 22*a–g*, 24*a–f* that are not parallel to the direction of the light at A.

The light sources 42*a–f* shown in FIG. 2 are mounted on a light source circuit board 44, however, the light sources 42*a–f* may be mounted in the light source assembly 40 without a light source circuit board 44. For example, incandescent lamps may be positioned within the light source assembly 40 with a reflective backing that reflects light in the direction the light guide 20. The reflective backing may be provided by coating the inside surface of the light source assembly 40 with a reflective material. In addition, a fiber optic source may emit light through a fiber optic cable for each light source 42*a–f*.

The perspective view in FIG. 2 shows the manner in which the first and second surface sections 22, 24 directs the light toward light emitting surface 26. The illumination provided by the display device 10 gives it a unique appearance that may be modified by using different orientations and angles for the surface sections 22, 24. In the light guide 20 in FIG. 2, the first surface sections 22*a–g* are oriented substantially parallel to the light emitting surface 26. Different orientations having different angles between the first and second surface sections 22, 24 may be used to provide illumination in the direction at B with selected lights spread distribution. In addition, the configurations of the first and second surface sections 22, 24 may also be modified to vary the appearance of the display device 10 in its illuminated state. A further advantage of the display device 10 is that it may be designed to reflect light at a variety of different angles from vertical. The orientation of the first surface sections 22*a–g* may also influence the efficiency of the system as well.

FIG. 3 is a side view of the display device 10 showing light traveling through the light guide and reflecting off the surface sections to provide illumination through the light emitting surface 26. The light radiated at 80 from the light emitting surface 26 has a light spread distribution indicated by an angle $\alpha_1$. The light is generated by the light source 42 and transmitted through the light guide 20 at an internal light spread distribution indicated by angle $\alpha_2$. FIG. 3 shows how the internal light spread distribution angle $\alpha_2$, the substrate material (i.e. its refractive index), total internal reflection off of the surface sections 22, 24 and refraction at the light emitting surface 26 may determine the light spread distribution at angle $\alpha_1$. By proper selection of these factors, the light spread distribution angle $\alpha_1$ may be selected.

The light source 42 radiates light in the direction of the adjacent light coupler 32 The light coupler 32 is preferably a Fresnel lens designed to spread the light that it receives from the light source 42 at the angle $\alpha_2$. The Fresnel lens also spreads light in the horizontal direction.

The light coupler 32 may be designed to provide a light spread that is close to that of collimated light as shown at 82. The light spread from the light coupler 32 is preferably sufficient to cause total internal reflection off of the first and/or second surface sections 22, 24 and the light emitting surface 26 without emitting light through the light guide surface 23 by refraction.

In addition, the intensity of the light at 80 emitted at the light emitting surface 26 may be maximized by ensuring that all of the light internally incident upon the light guide surface 23 is internally reflected to be incident on the light emitting surface 26 such that it is emitted by refraction. Any light that is internally reflected at the light emitting surface 26 must reflect at an angle that will cause internal reflection off the light guide surface 23.

Maximum intensity may be achieved by designing the light guide surface 23 to have selected angles between the first surface sections 22a–g and the light emitting surface 26 as shown by angle Φ, and to have selected reflective angles between the first surface section and the second surface section as shown by angles $\Theta_1$ through $\Theta_6$. The angles $\Theta_1$ through $\Theta_1$ formed by first and second surface sections 22, 24 shown in FIG. 3 are substantially the same. The angles $\Theta_1$ through $\Theta_1$, however, may be different to cause total internal reflection of the light in a manner that varies the light spread distribution at $\alpha_1$ as well as the appearance of the display device 10. In one presently preferred embodiment, the angles $\Theta_1$ through $\Theta_6$ are at about 151°, however, different angles may be selected for different applications and for producing different effects as discussed above.

In addition to using different angles $\Theta_1$ through $\Theta_1$, the number of surface sections on the light guide surface 23 may be varied. In FIG. 3, there are seven first surface sections 22a–g and six second surface sections 24a–f. The number of surface sections may be different for specific applications to obtain desired effects, such as different appearances and intensities.

Other ways of obtaining selected light spread distributions $\alpha_1$ includes using different substrate materials and light couplers 32. The substrate material of the light guide 20 may be chosen to vary the angle of refraction at the light emitting surface 26 as shown at 90. The internal light spread distribution $\alpha_2$ may also be adjusted by using different light couples 32 to obtain a selected light spread distribution $\alpha_1$.

FIGS. 4A and 4B show options for light couplers 32 that provide different internal light distributions $\alpha_2$. FIG. 4A shows a cross section of the light guide 20 in FIG. 3 at section 4–4' showing round lenses 132a–f mounted at the light source end 21. The lenses in FIG. 4A are preferably Fresnel lenses such as the Fresnel lens 132a. Other lenses that may be used include divergent lenses, lens combinations such as a convergent and divergent lens combination, or any other spheric/aspheric lens capable of being configured to provide the selected internal light spread distribution $\alpha_2$ (shown in FIG. 3).

The lenses may be adjusted to provide a light spread distribution $\alpha_2$ using one of several techniques. The lenses may be adjusted to defocus the light source. The light source may also be adjusted to be offset from the center of the lenses. This is shown in FIG. 4A by a source point S offset by O relative to the center C of the lens 132b.

Another technique for providing a light spread distribution is to provide a combination of convergent and divergent lenses that do not entirely collimate the light from the light source. The lenses may also be tilted relative to the sources.

FIG. 4B shows the cross section of the light guide 20 having a plurality of lenses 134a–d that are elliptical in shape. The advantage of using the elliptical lenses 134a–d is that the amount of light radiated from the light source 42 (shown in FIG. 3) may be maximized by capturing in the lenses 134a–d light that would otherwise be directed between the lenses.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A display device comprising:
   at least one light source operable to radiate a light in a first direction;
   at least one light coupler adjacent the at least one light source to receive the light, the at least one light coupler being operable to distribute the light in the first direction;
   a light guide comprising a substrate material, the light guide having:
      a light source end adjacent the at least one light coupler to receive the distributed light;
      a light emitting surface extending from the light source end substantially along the first direction; and
      a light guide surface extending from the light source substantially along the first direction, the light guide surface being opposite the light emitting surface; and
   the light guide surface comprising a plurality of first surface sections, the first surface sections extending substantially non-parallel to the light emitting surface and each first surface section separated by at least one of a plurality of second surface sections, the second surface sections extending substantially non-parallel to the light emitting surface, the first surface sections extending at different angles from the second surface sections, at least one of the first and second surface sections being at a reflective angle to provide reflection of the light generated by the light source at the at least one first and second surface sections, the reflective angle of the at least one of the first and second surface sections further providing for refraction of the reflected light at the light emitting surface with a light distribution spread in a second direction.

2. The display device of claim 1 wherein:
   at least one of the first surface sections extending at a second reflective angle from the light source end, the second reflective angle causing the light to reflect such that the reflected light from the at least one of the first surface sections diverges from the reflected light from the second surface sections.

3. The display device of claim 1 wherein:
   at least one of the first surface sections extending at a second reflective angle from the light source end, the second reflective angle causing the light to reflect such that the reflected light from the at least one of the first surface sections converges from the reflected light from the second surface sections.

4. The display device of claim 1 wherein the substrate material may be a material selected from the group consisting of: acrylic, polycarbonate, plastic, or glass.

5. The display device of claim 1 wherein the at least one light source includes light source devices selected from the group consisting of: light emitting diodes (LEDs), fiberoptic device outputs, tubular light sources, and incandescent lamps.

6. The display device of claim 1 wherein the at least one light coupler includes light coupling devices selected from the group consisting of: a fresnel lens, a substantially round ashperic lens, a substantially round spheric lens, and a substantially elliptical aspheric lens.

7. The display device of claim 1 comprising:
   a plurality of light couplers arranged linearly; and
   a plurality of light sources arranged linearly, each light source being positioned adjacent a corresponding light coupler.

8. The display device of claim 1 wherein the reflective angle is approximately 150 degrees.

* * * * *